(12) United States Patent
Kauniskangas et al.

(10) Patent No.: US 9,386,221 B2
(45) Date of Patent: Jul. 5, 2016

(54) PORTABLE LATERAL TEST READER

(71) Applicant: iStoc Oy, Oulunsalo (FI)

(72) Inventors: Hannu Kauniskangas, Oulunsalo (FI); Jarmo Jarvenpaa, Oulunsalo (FI)

(73) Assignee: iStoc Oy, Oulunsalo (FI)

( * ) Notice: Subject to any disclaimer, the term of this patent is extended or adjusted under 35 U.S.C. 154(b) by 296 days.

(21) Appl. No.: 14/190,202

(22) Filed: Feb. 26, 2014

(65) Prior Publication Data

US 2014/0240491 A1  Aug. 28, 2014

(30) Foreign Application Priority Data

Feb. 28, 2013  (FI) ...................................... 20135189

(51) Int. Cl.
*H04N 5/232* (2006.01)
*H04N 17/02* (2006.01)
*G06T 7/00* (2006.01)
*H04N 17/00* (2006.01)

(52) U.S. Cl.
CPC .......... *H04N 5/23229* (2013.01); *G06T 7/0004* (2013.01); *H04N 17/002* (2013.01); *G06T 2207/10016* (2013.01); *G06T 2207/30168* (2013.01)

(58) Field of Classification Search
CPC ............. H04N 5/23229; H04N 17/002; G06T 2207/10016; G06T 2207/30168; G06T 7/0002; G06T 7/0004
USPC .......................................................... 348/135
See application file for complete search history.

(56) References Cited

U.S. PATENT DOCUMENTS

| 2007/0058165 A1* | 3/2007 | Mondello ............... G01N 21/65 356/301 |
| 2011/0293153 A1 | 12/2011 | Plickert et al. |
| 2014/0240491 A1* | 8/2014 | Kauniskangas ...... H04N 17/002 348/135 |
| 2015/0010992 A1* | 1/2015 | Fleming ................ B01L 3/5023 435/287.2 |

FOREIGN PATENT DOCUMENTS

| WO | 2010104937 A2 | 9/2010 |
| WO | 2012131386 A1 | 10/2012 |
| WO | 2012166795 A1 | 12/2012 |

OTHER PUBLICATIONS

Finnish Search Report, dated Oct. 23, 2013, from corresponding FI application.

* cited by examiner

*Primary Examiner* — Gelek W Topgyal
(74) *Attorney, Agent, or Firm* — Young & Thompson (57) ABSTRACT

A portable lateral test reader apparatus includes a processing arrangement, a digital camera, a user interface. The digital camera captures at least one image of locations of at least one test line, at least one control line and at least one reference of a test structure. The processing arrangement measures an intensity associated with the at least one test line, an intensity associated with the at least control line and an intensity of the at least one reference in the at least one image, forms a test result as a function of measured intensities associated with the at least on test line, the at least control line and the at least one reference, and outputs the test result using the user interface.

13 Claims, 9 Drawing Sheets

PORTABLE LATERAL TEST READER

FIELD

The invention relates to a portable lateral test reader.

BACKGROUND

Tests such as lateral flow tests which measure colour or pattern variation of at least two lines in a test strip are read with manufacturer-specific readers, but more generic apparatuses are currently emerging. As an example, a portable mobile consumer electric device is described in WO 2012/131386.

When a portable camera is used for capturing an image of a test strip, the lighting condition varies a lot due to many reasons such as: an angle of view may be different for different captures; angle of illumination is usually different for different captures; a camera can cover and shadow a part of the test strip when capturing an image; a camera user can obscure or shadow a part of the test strip during capturing an image; intensity of a flash of the portable camera is stronger at one side than at another side of the imaged area; due to the angle variations illumination from a light source such as flash or from the sun may cause severe over-exposure or under-exposure in some parts of area imaged.

This variation causes the lines in the test strip to be differently illuminated and differently detected by the portable camera. For example, a test strip can be imaged in various directions: left to right, right to left, upside down or downside up. An accurate control of illumination cannot be arranged because an image of the area indicating test result is captured without a standardized test box.

As the test reader is used by a lateral flow assay test user, who is probably not an expert in taking pictures, all other kinds of variations such as tremble of hands, occasional operational errors and many other disturbances may cause failure in capturing the image, quality deterioration or quality loss in the image.

Hence, there is need for improvement in the ratiometric measurements made by a portable camera.

BRIEF DESCRIPTION

The present invention seeks to provide an improved portable test reader apparatus. According to an aspect of the present invention, there is provided a portable test reader apparatus as specified in claim 1.

According to another aspect of the present invention, there is provided a method for a portable test reader apparatus in claim 12.

According to another aspect of the present invention, there is provided a computer-readable medium as specified in claim 13.

The invention provides better reliability of the test also in non-ideal conditions.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while Figures illustrate various embodiments, they are simplified diagrams that only show some structures and/or functional entities. The connections shown in these Figures may refer to logical or physical connections. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although separate single entities have been depicted, different parts may be implemented in one or more physical or logical entities.

Figure 1:
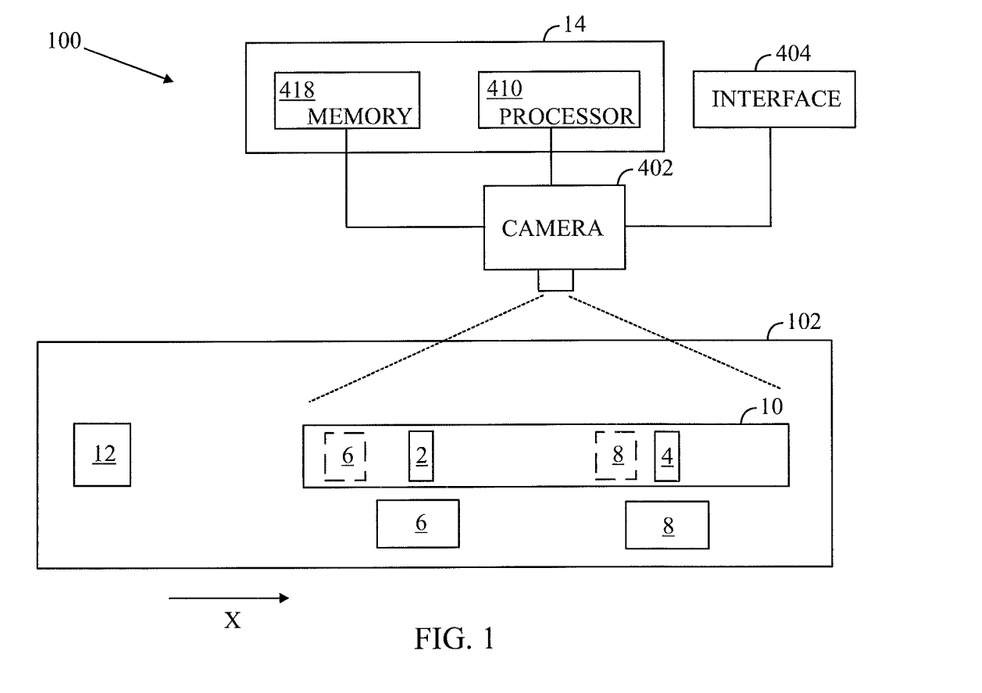
FIG. 1 illustrates an example of capturing images of the test reader structure.

FIG. 1 presents an example configuration of capturing an image of a test structure 102 of a lateral flow test. The later flow test may also be called an immunochromatographic test. The test structure 102 may comprise a test strip or a dipstick in an embodiment. A portable test reader 100 comprises a digital camera 402, a user interface 404 and a processing arrangement 14. The processing arrangement 14 of the test reader 100 may comprise one or more processors 410 and one or more memories 418 which include one or more computer programs. The portable test reader 100 may be a mobile phone, for example. The one or more memories 418 and the one or more computer programs together with the one or more processors 410 cause the portable test reader 100 to perform image capturing and image processing in the following manner.

The digital camera 402 captures at least one image of locations where at least one test line 2 (or test stripe), at least one control line 4 (or control stripe) and at least one reference 6, 8 of a test structure 102 are. The camera 402 may capture separate still images or a sequence of images in a form of video.

The purpose of the at least one test line 2 is to indicate the test result. The purpose of the at least one control line 4 is to indicate whether the test is fully successful or whether something in the sampling went wrong. The purpose of the at least one reference is to improve the accuracy and reliability of the detection of the test and control lines.

FIG. 1 has two separate references 6, 8 but in an embodiment there is only one reference, the references 6, 8 being actually a part of the same continuous or non-continuous reference. The at least one reference 6, 8 may have any desired shape. If more than one different references 6, 8 are used, the references may have optically similar properties in an embodiment. Alternatively, at least two references may have optically different properties in an embodiment. The optical property may mean a colour, grey scale or reflectance, for example. The test structure 102 may have its surface treated at a location of the at least one reference 6, 8 with a tool or coloured substance for having a desired optical property. The area of the reference may comprise a standard white paper or pigment, for example. At least one reference 6 may be adjacent to a test line 2 and at least one reference 8 may be adjacent to a control line 4. Each test line 2 may have its own reference 6 and each control line 4 may have its own reference 8. A test line 2 and a control line 4 may also have a common reference.

The test structure 102 may have an input 12 where a sample may be fed to a test and the sample may be proceed to an output 200 for a reaction through a (micro) capillary tube. Alternatively, the test structure 102 may be dipped (dipstick) fully or partly in a sample in which case the test structure 102 doesn't necessarily have a separate input 12 but a part of the test structure 102 or the whole test structure 102 servers as an input 12.

The at least one test line 2 and the at least one control line 4 may reside in a test window 10 of the test structure 102. The at least one reference 6, 8 may be beside the test window 10 or inside the test window 10. The potential references 6, 8 inside the test window 10 are shown with dashed lines in FIG. 1. The test window 10 and the at least one reference 6, 8 may be found by analysing the images provided by the camera 402.

In an embodiment, the test window 10 may have a specific shape which is optically distinguishable from the environment and by detecting that such a specific shape is in the angle of view area, the test reader 100 may determine that at least one image may be captured.

In an embodiment, the test structure 102 may also have a specific shape which is optically distinguishable from the environment, and when the test reader 100 detects that such a specific shape is in the angle of view area, the test reader 100 may determine that at least one image may be captured.

In this manner, at least one image may be captured of the area of interest where the lines leading to the test results are to be found.

In an embodiment, the test window 10 may be detected on the basis of frame lines and corner points which are searched for in each image. Then the test reader 100 may set, match and compare corner masks (model of corners) to the corner areas found in an image. Based on these criteria, the area of interest which comprises the test window 10 and the at least one reference 6, 8 may be selected and approved.

After the test window 10 has been found and accepted, the at least one expected test line 2 and the at least one expected control line 4 may be searched for. Also the at least one reference 6, 8 may be searched for but that is not necessary because the at least one reference 6, 8 may be in the image when the test window 10 is properly found.

In an embodiment, the test window 10 and the at least one reference 6, 8 may have a specific shape which is optically distinguishable from the environment and when the test reader 100 detects that such a specific shape is in the angle of view area, the test reader 100 may determine that at least one image may be captured.

Figure 2:
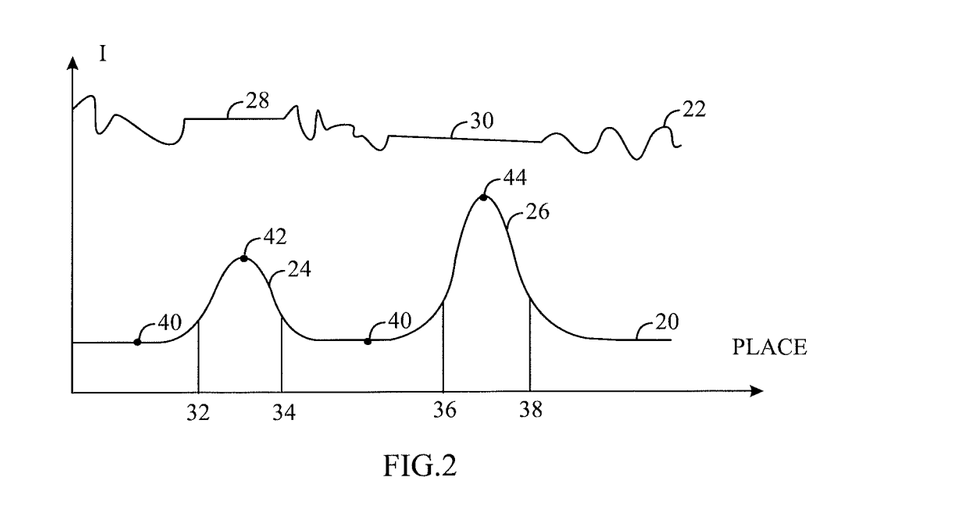
FIG. 2 illustrates example of detected intensities.

FIG. 2 presents an example of intensity distribution 20 over the test window 10 and intensity distribution 22 over the references 6, 8. The x-axis denotes a location in the test structure 102 in an arbitrary scale and the y-axis denotes intensity of detected optical radiation at one or more bands of optical radiation in an arbitrary scale. The intensities of the detected radiation may refer to an intensity of hue, colour, chroma, brightness or the like. The peak 24 of distribution 20 refers to intensity of a test line 2 and the peak 26 of distribution 20 refers to intensity of control line 4. The areas 28, 30 of distribution 22 refer to intensities of references 6, 8. The areas 28, 30 may have a determined shape which may be rather flat or they may have a shape of a predetermined curve.

In an embodiment, the searching for the at least one test line 2 and the at least one control line 4 may be performed by calculating a gradient in the x-direction and forming a profile chart of the gradient in the x-direction, where the x-direction is parallel to the longitudinal axis of the test structure 102. The gradient of a line results in a bipolar cycle having two peaks in opposite directions such as a positive peak and a negative peak one after another, for example. The heights of the peaks indicate the intensity of the line.

In an embodiment, at least one local minimum and at least one local maximum point may be searched for from the profile chart. A minimum point 40 may be a point before or after a maximum peak 42, 44.

In an embodiment, possible candidates for the lines 2, 4, 6 may be defined on the basis of the minimum and maximum points. For example a test line 2 may be determined to be between places 32, 34 because the places 32, 34 are slightly above the minimum 40 but clearly lower than the maximum peak 42. In a similar manner, a control line 4 may be determined to be between places 36, 38 because the places 36, 38 are slightly above the minimum 40 but clearly lower than the maximum peak 44. The detection of lines is known per se.

In an embodiment, positions of the candidate lines 2, 4, 6 may be calculated.

In an embodiment, it may be judged whether the found lines are desired lines on the basis of predetermined criteria which determine the expected positions and intensities of the lines 2, 4, 6. For example, a distance between test line(s) and control line(s) and/or their intensities should be in a predetermined range for a proper measurement.

The quality of a single image may be determined by a following image analysis, for example:

how many frame lines or frame line dots there are between the corner points;

how many test and/or control lines have been found;

how thick are the found test and/or control lines;

how the found test and/or control lines or corners of the window 10 are placed in the image;

what is the intensity of the test and/or control lines, corner points etc.

If the number of the frame lines (or frame line dots), the number of the test and/or control lines and the thicknesses are larger and the intensities are stronger than a predetermined threshold and the places are correct with respect to what is expected, the test may proceed. The places of the test and/or control lines and corners are expected to be properly inside of the angle of view of the digital camera 402 i.e. in an image such that also the at least one reference 6, 8 is in the image.

When test reader 100 determines the found lines 2, 4, 6 correct, measurements may be performed.

In prior art, the LFA test result has been calculated as a ratio between the intensity value of the test line 2 and the intensity of the control line 4, which are in the window 10 of the LFA test stripe. However, the illumination of the lines is not always ideal that causes a challenge for illumination. It is also a problem that actually rather little can be done to the illumination. To arrange a proper illumination would limit freedom to do the mobile test anywhere.

Now the test reader 100 measures the intensity associated with the at least one test line 2, an intensity associated with the at least control line 4 and an intensity of the at least one reference 6, 8 in the at least one captured image. The test reader 100 then forms a test result as a function of measured intensities associated with the at least on test line, the at least control line and the at least one reference, and outputs the test result using the user interface 404. In this manner, the ratiometric method allows the user to perform his/her test freely anywhere without the need to worry illumination and the reliability of the test. If the at least one test line 2 and/or the at least one control line 4 are not found i.e. their intensities are so weak that they cannot be distinguished from the environment and/or from noise, a failure of the test may be given as a test result.

In an embodiment, the test reader 100 may form at least one test reference ratio as a function of one or more test line intensities and one or more reference intensities. Each test reference ratio may be formed on the basis of an intensity 24 of a test line 2 and an intensity 28 of a reference 6. Each test reference ratio Rtr may be a ratio of an intensity I(Test) 24 of a test line 2 and an intensity I(reference) 28 of a reference 6. The test reference ratio Rtr may mathematically be expressed as $Rtr = I(\text{Test})/I(\text{reference})$.

In an embodiment, the test reader 100 may form at least one control reference ratio as a function of one or more control line intensities and one or more reference intensities. Each control reference ratio may be formed on the basis of an intensity 26 of a control line 4 and an intensity 30 of a reference 8. Each control reference ratio Rcr may be a ratio of an intensity I(Control) of a control line 4 and an intensity I(reference) of a reference 8. The control reference ratio Rcr may mathematically be expressed as $Rcr = I(\text{Control})/I(\text{reference})$.

In an embodiment, the test reader 100 may form the intensity on the basis of a height of a peak 24, 26, an area of a peak 24, 26, an average of a peak 24, 26. The area of a peak 24, 26 and the average height of a peak 24, 26 may be formed using the height values between predetermined places 32, 34 for I(Test) 24 and places 36, 38 for I(Control) 26. The area indicating the intensity I(Test) 24 may be formed by integrating the curve of the intensity I(Test) 24 from place 32 to place 34 and the area indicating the intensity I(Control) 26 may be formed by integrating the curve of the intensity I(Control) 26 from place 36 to place 38. The average may be formed by dividing an area referring to an intensity of a test line or a control line by a corresponding length between the places i.e. number of the places used in the integration of the area. The intensity of reference may be formed in a similar manner. The actual integration may be performed using intensity curves in FIG. 2 or a gradient of the intensity curves.

In an embodiment, the test reader 100 may form the test result on the basis of at least one result ratio as a function of one or more test reference ratios and one or more control reference ratios. Each result ratio may be formed on the basis of a test reference ratio Rtr and a control reference ratio Rcr. Each result ratio Rr may be a ratio of a test reference ratio Rtr and a control reference ratio Rcr. The result ratio Rtr may mathematically be expressed as $Rr = Rtr/Rcr$.

In an embodiment, the test reader 100 may form each test reference ratio Rtr on the basis of an intensity I(Test) of a test line 2 and an intensity I(reference) of a corresponding reference 6. A reference 6 and a test line 2 may be meant to be a pair in the test such that their intensities are compared with each other. Then such a reference 6 may be adjacent to the test line 2.

It is easy to understand that if a control line 4, for example, is shadowed by the camera 402 in one test, and the test line 2 is in a shadow in another test, the ratios of the test line 2 and the control line 4 are different although the lines 2, 4 were the same in controlled illumination. By using at least one reference which may similarly be in a shadow with the test line or control line, the ratios may be determined more accurately which increases reliability of the test.

In an embodiment, the test reader 100 may form each control reference ratio Rcr on the basis of an intensity I(control) of a control line 4 and an intensity I(reference) of a corresponding reference 8. A reference 8 and a control line 4 may be meant to be a pair in the test such that their intensities are compared with each other. Then such a reference 8 may be adjacent to the control line 4.

A piece of advantages comes from comparisons of the intensity of the test line 2 to the intensity of the reference 6 adjacent to the test line 2, and the intensity of the control line 4 to the intensity of the reference 8 adjacent to the control line 4. Further, the comparison between the test reference ratio and control reference ratio increases the reliability. Additionally, the test result is not limited to positive or negative result but even the numerical value such as CRP 42 mg/l related to C-reactive protein test may be given on the basis of analysis of the at least one image.

In an embodiment, the test reader 100 may reject a test reference ratio Rtr if the intensity I(Test) of the test line 2 is outside a predetermined range. If a test line 2 is either too bright such that it is over-exposured or too dim, the intensity is out of the predetermined range and result may not be reliable. For making the test more reliable, the test reference ratio Rtr may be rejected from the test. If the predetermined range is 5% to 95% of the maximum detectable intensity of the digital camera 402 and the detected intensity I(Test) is in the predetermined range, for example, the intensity I(Test) is acceptable. Correspondingly if the predetermined range is 1% to 99% of the maximum detectable intensity of the digital camera 402 and the detected intensity I(Control) is in the predetermined range, for example, the intensity I(Control) is acceptable. Rejecting bad results improves accuracy of the test.

In an embodiment, the test reader 100 may reject a control reference ratio Rcr if the intensity I(Control) of the control line 4 is outside a predetermined range. In a similar manner to rejection of a test reference ratio Rtr, if a control line 4 is either too bright such that it is over-exposured or too dim, the result may not be reliable. For making the test more reliable, the control reference ratio Rcr may be rejected from the test.

In an embodiment, the test reader 100 may form different result ratios on the basis of a plurality of images. Each image may have its own result ratio, for example, which may come from one measured result ratio or which may be formed from a plurality of result ratios. Each image may also have more than one result ratio. In an embodiment, the test reader 100 may determine a quality of the result ratios on the basis of variation in the result ratios associated with more than one image.

Another piece of advantage comes from the use of a plurality of images of an image sequence. When the above mentioned operations are performed to intensities of a test line, control line and at least one reference in several images or frames of video, the test result can be made more reliable and accurate. When reading an LFA test results by a portable reader, it should also be as easy and as automatic as possible to improve the quality of the picture and in such a manner to improve the quality of the test itself. Further, it makes the testing convenient and user friendly.

In an embodiment, the test reader 100 may filter the result ratios in a statistical manner for improving the test result. In an embodiment, the test reader 100 may perform filtering by at least one of the following: averaging, median filtering, rejecting a result ratio deviating from an average more than a predetermined threshold variation. The filtering may be used to reduce noise and errors.

In an embodiment, the test reader 100 may accept the result ratios associated with an image if the quality is higher than a predetermined threshold. If the result ratios of more than one image are accepted, the test reader 100 may output the test result if the number of acceptable images is higher than a predetermined threshold. The predetermined threshold may be a relative threshold. For example, if more than a certain percentage of images have accepted result ratio, the test reader 100 outputs the test result. The relative threshold may be in a range of 30% to 90%, for example, without limiting to these values. The test reader 100 may capture or receive a plurality of images the number of which may be P. If a predetermined number V of the images or a larger number of images have accepted result ratios, where P≥V, the test reader outputs the test result. The number P may be 10 and the number V may be 6, for example, without limiting to these values. The capture of images may be continued so long that number of accepted images is higher than the predetermined threshold.

In an embodiment, the test reader 100 may detect the test window 10 and the at least one reference 6, 8 of a test structure 102 for image capturing. The test window 10 includes the at least one test line 2 and the at least one control line 4, and the at least one reference 6, 8 being physically beside the test window 10.

In an embodiment, the test reader 100 may determine a quality for each image of the test window in N images, where N is an integer. Then the test reader may accept an image for the measurement if the quality of the test window 10 is better than a predetermined threshold quality. The quality may be determined on the basis of pixels between predetermined spots in the image, for example. The predetermined spots may be corners of the test window 10, for example. If the number of pixels between the corner pixels is too small i.e. below the threshold quality, the image may be rejected from the measurement. The threshold quality may be equal to or more than tens of pixels, for example. The quality may also refer to recognition of the test window. If the test window 10 is not recognized in an image, the image is rejected from the measurement. All in all, if the threshold quality is achieved, the image is accepted for the measurement but if the threshold quality is not achieved, the image is rejected whatever detected property is used as the quality. Then the test reader 100 may perform the measurement with M images if M images of the N images have an accepted quality, where M is an integer, N being equal to or larger than M. In an embodiment, an average value for the each test line 2 and each control line 4 is formed using the test lines 2, the control lines 4 and the references 6, 8 in the plurality of M images.

In an embodiment, the lateral test reader 100 may continue capturing images until M images of the N images have an accepted quality.

In an embodiment, the portable lateral test reader 100 may reject an image of unacceptable quality and capture a new image to replace it as long as an image of acceptable quality is available. The portable lateral test reader 100 may continue the capture until the M accepted images are received. Otherwise the user may stop the test or a timer which may be a part of the portable lateral test reader 100 or operationally connected to the portable lateral test reader 100 may stop the test.

Figure 3:
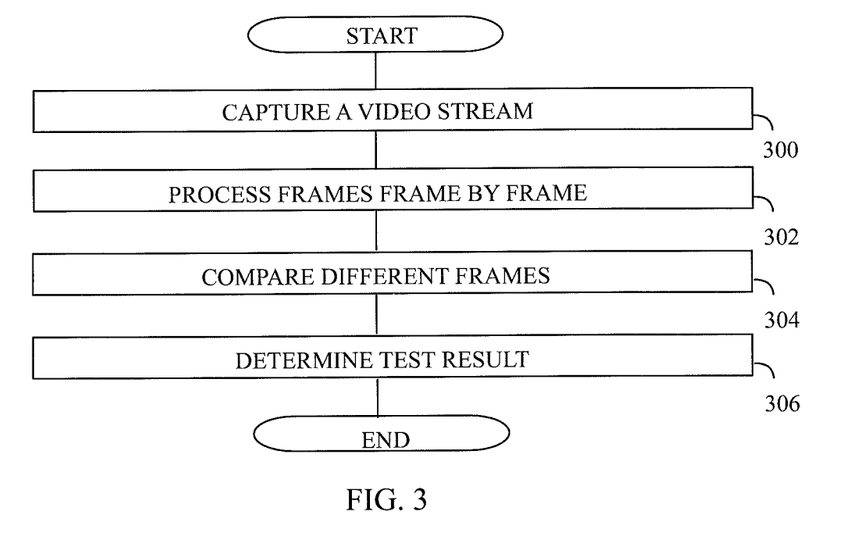
FIG. 3 illustrates example of an example of video capturing.

FIG. 3 illustrates an example of video capturing once more. In step 300 a video is taken. In step 302, video frames are processed frame by frame. The frame processing may include searching for the test window 10, searching for the at least one test line 2 and the at least one control line 4. Then the processing may include the calculation of ratios and quality for each frame separately as explained earlier. After that, calculated ratios of successive frames are compared with each other. The comparison includes keeping and saving the calculated test results and quality parameters of each frame separately and comparing different ratios of different frames with each other. The ratios may include at least one of the following: a test reference ratio, a control reference ratio, a test result of a single frame. Then the quality parameters of different frames may also be compared to each other and also to a predetermined threshold such that only the qualified ratios will be used for calculating the final test result.

Figure 4:
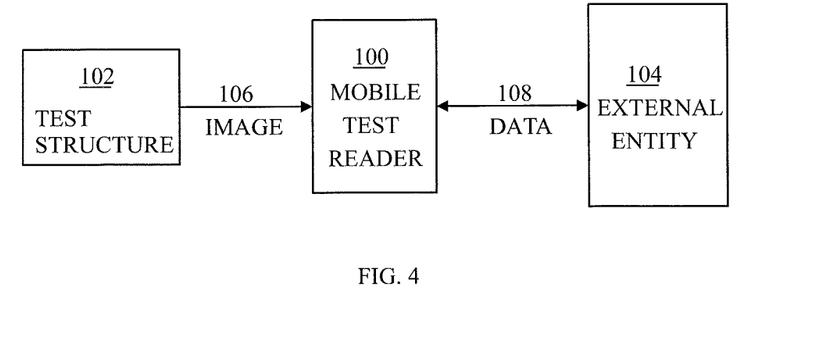
FIG. 4 illustrates an example embodiment of a general operating environment.

FIG. 4 illustrates an example embodiment of a general operating environment. A portable test reader 100 takes an image 106 of a test structure 102. Furthermore, the portable test reader 100 may communicate data 108 relating to the test structure 102 with an external entity 104.

Figure 5:
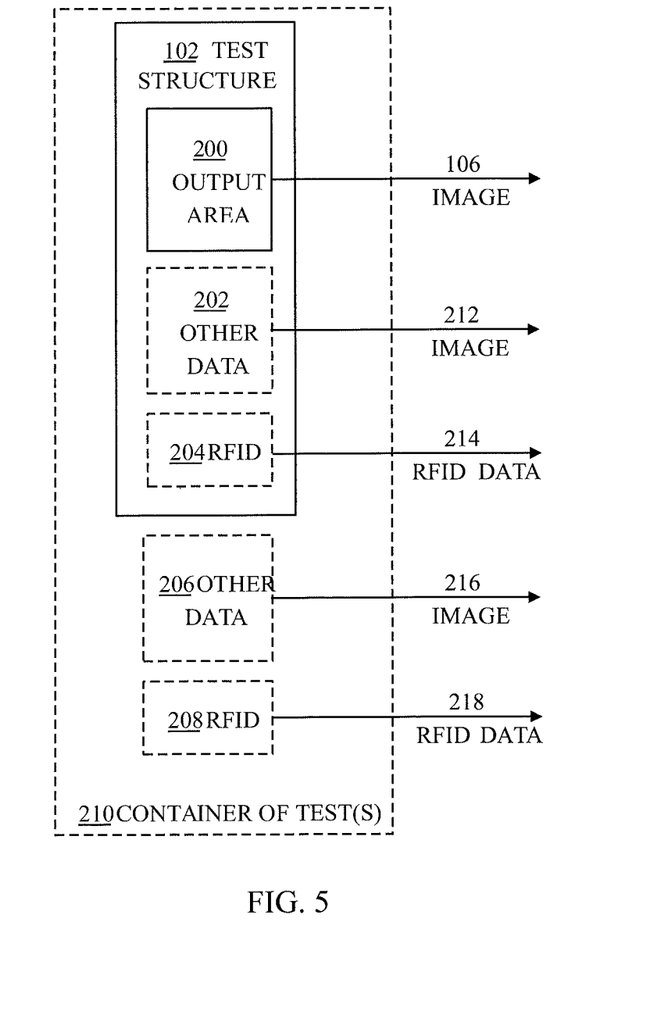
FIG. 5 illustrates example embodiments of a test.

FIG. 5 illustrates example embodiments of the test structure 102. The test structure 102 is capable of measuring a certain property of a target analyte in a sample. In its simplest form, the test structure 102 is capable of detecting the presence (or absence) of the target analyte in the sample. As the test structure 102 is usually relatively simple and cheap, it may be used for various diagnostics at home or in the field, for example, but also in clinics and laboratories.

The test structure 102 may be applied to human or animal secretions such as urine, saliva, blood, or stool samples, or also to other substances such as food or water. Accordingly, the test structure 102 may be utilized for medical testing of humans or animals, or testing food and water for contaminants, ingredients and/or traces of other substances, for example.

In an example embodiment, the test structure 102 may be used for a (clinical) point of care test for pregnancy, fertility, HIV, coronary artery disease, malaria, drug abuse, respiratory disease, or some other medical condition.

In an example embodiment, the test structure 102 may be used for a lateral flow test (also known as a lateral flow immunochromatographic assay).

The test structure 102 comprises an output 200 whose visual appearance changes to show the result of the test. In the lateral flow test structure 102, the output 200 may comprise at least one line. The output 200, which comprises a conjugate, may be coupled by at least one capillary bed to the input 12. The line may change colour or shape as a result of a specified reaction between a target substance or molecule in the sample and its partner in the conjugate. The reaction may be chemical.

In an example embodiment, the test structure 102 may be hierarchical, meaning that it may include more than one parallel tests, and even that one or more of the parallel tests may in turn include a number of subtests.

In an example embodiment, besides being the lateral flow test, the test structure 102 may be any test of at least one such chemical property that affects the visual appearance of the output 200.

In an example embodiment, the test structure 102 may also comprise, besides the output 200, other data 202 that may be inspected visually in the form of an image 212.

In an example embodiment, the test structure 102 may comprise a radio frequency identifier (RFID) tag 204 capable of storing data that may be read 214 wirelessly.

In an example embodiment, a container 210 of the test structure 102 may comprise other data 206 that may be visually inspected in the form of an image 216, and/or a radio frequency identifier tag 208 capable of storing data that may be read 218 wirelessly. The container 210 may contain only one test structure 102 or a specific number of tests 102. The container 210 may comprise a carton box.

Figure 6:
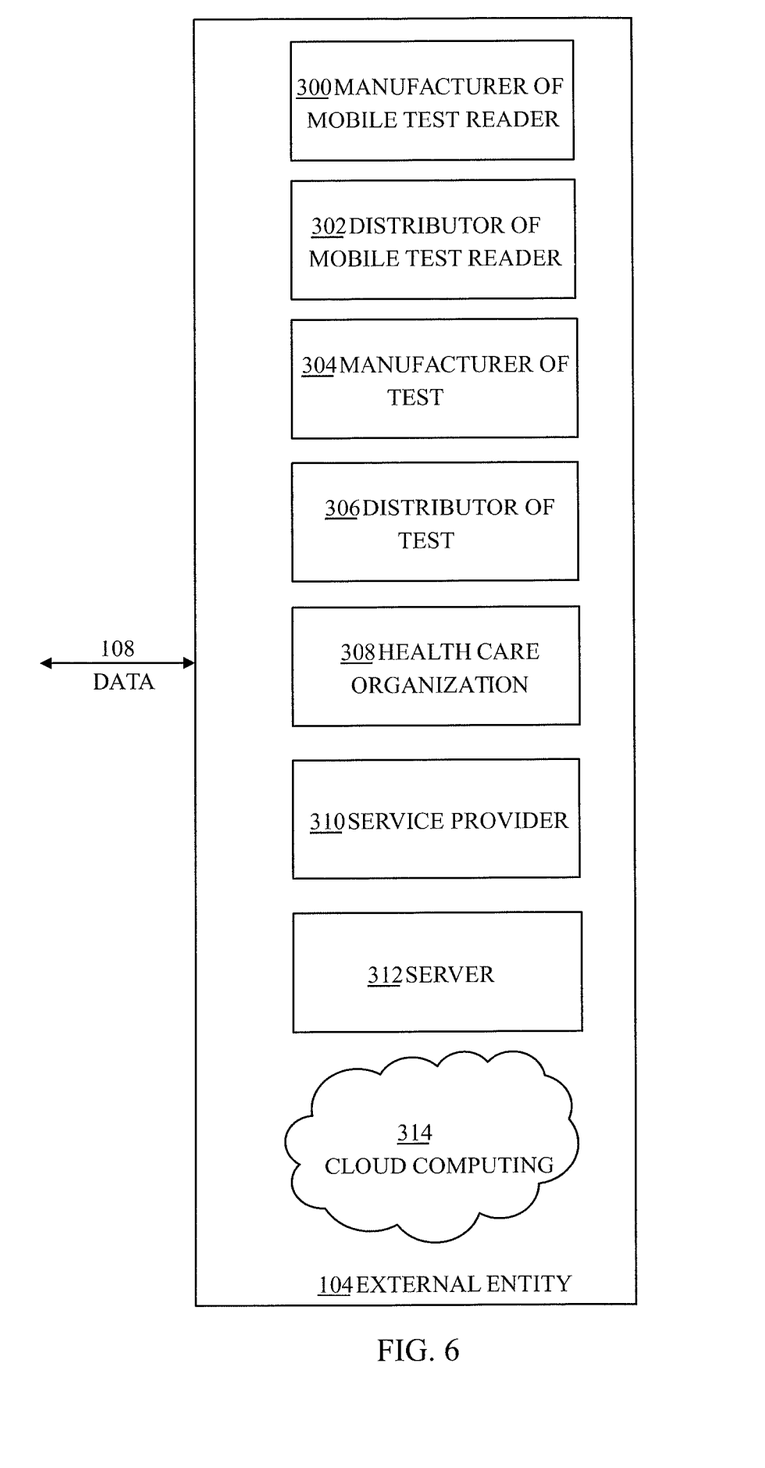
FIG. 6 illustrates example embodiments of an external entity.

FIG. 6 illustrates example embodiments of the external entity 104. The term "external entity" 104 refers to any interest group having a legitimate interest in the use of the test structure 102 and/or to any technical counterpart of the portable test reader 100. Accordingly, a non-exhaustive list of the external entity 104 comprises at least one of the following: a manufacturer 300 of the portable test reader 100, a distributor 302 of the portable test reader 100, a manufacturer 304 of the test structure 102, a distributor 306 of the test structure 102, a health-care organization 308, a service provider 310, a server 312, a cloud computing 314. Naturally, the desired operating environment determines the rights of the various interest groups and the properties of the selected technical counterparts.

Figure 7:
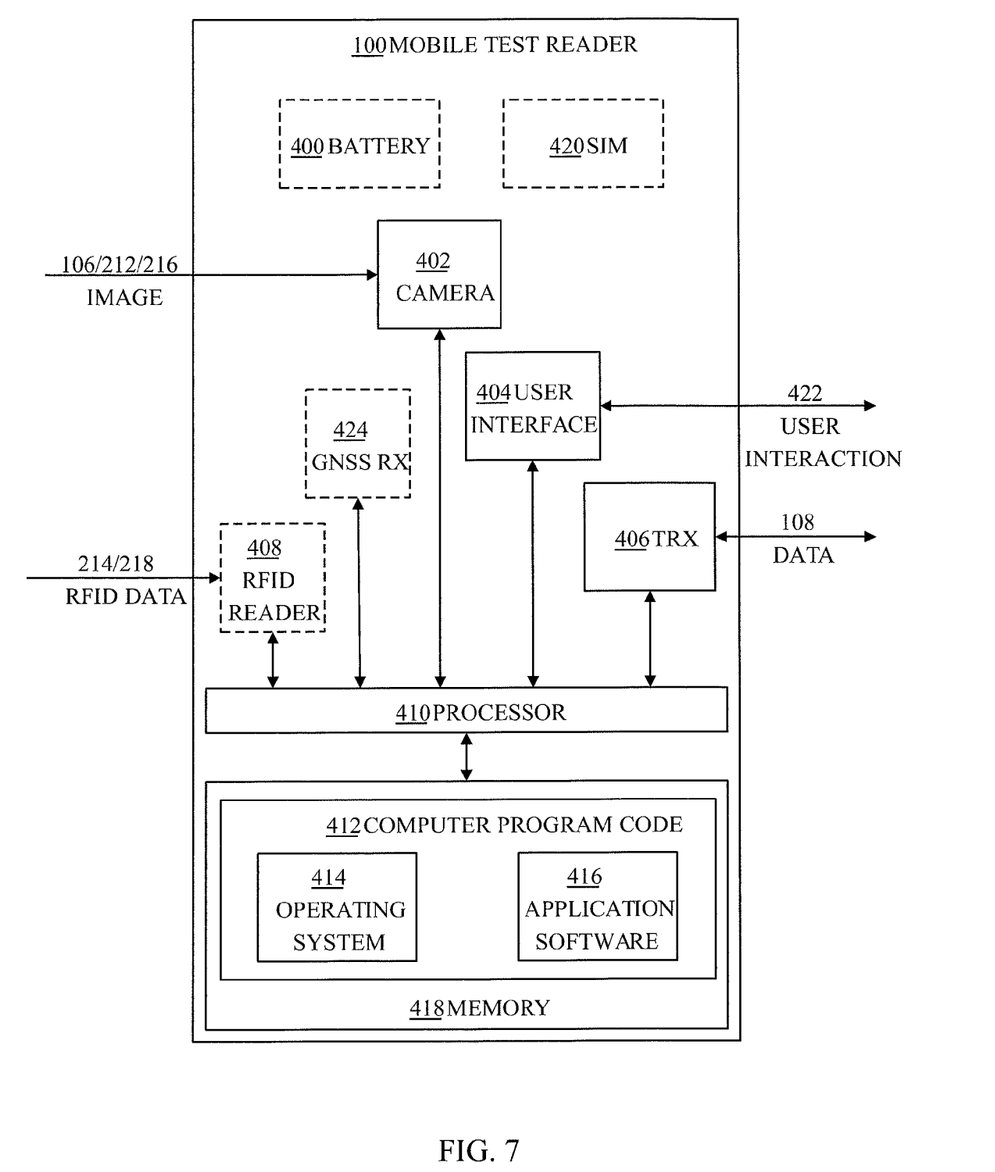
FIGS. 7, 8, 9 and 10 illustrate example embodiments of a mobile test reader.

FIG. 7 illustrates some example embodiments of the portable test reader 100. The portable test reader 100 may be any suitable mobile electronic apparatus. A non-exhaustive list of the types of the apparatus 100 includes: a mobile phone, a smartphone, a tablet computer, a general-purpose mobile computing device. In an example embodiment, the portable test reader 100 may be a general-purpose off-the-shelf computing device, as opposed to a purpose-build proprietary test reader, whereby research & development costs will be lower as only the special-purpose software (and not the hardware) needs to be designed, implemented and tested.

The portable test reader 100 may comprise a battery 400, a digital camera 402, a user interface 404, a wireless transceiver 406, and a radio-frequency identifier reader 408.

In an example embodiment, the electrical battery 400 which may be rechargeable or non-rechargeable may comprise one or more electrochemical cells that convert the stored energy of chemical form into electrical energy. Instead of battery 400, other suitable accumulator means may be used to store energy.

In an example embodiment, the digital camera 402 takes video or still photographs by an electronic image sensor through an optical system and records them in the one or more memories 418. The image sensor may be a CCD (Charge Coupled Device) or CMOS (Complementary Metal Oxide Semiconductor) cell.

In an example embodiment, the user interface 404 implements the exchange 422 of graphical, alphanumeric/symbolic and audio information with the user of the portable test reader 100. The user interface 404 may be realized with various techniques, such as a display, means for producing sound such as a loud speaker, for instance. The user interface 404 may also comprise a keyboard, and/or a keypad, for example. The display may be a liquid crystal display, for example, but it may also be implemented by any appropriate technique, such as with a matrix of light-emitting diodes. The display may comprise an active-matrix of organic light-emitting diodes. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 404 may comprise other user interface components, for example various means for focusing a cursor (mouse, track ball, arrow keys, touch sensitive area etc.) or elements enabling audio control.

In an example embodiment, the wireless transceiver 406 may be interoperable with various wireless standard/non-standard/proprietary communication networks such as any mobile phone network, regardless of the generation (such as 2G, 3G, 4G, beyond 4G, etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), and other radio systems (in their present forms and/or in their evolution forms), such as WLAN (Wireless Local Area Network) based on IEEE (Institute of Electrical and Electronics Engineers) 802.11 standard or its evolution versions (IEEE 802.11ac etc.), WiMAX (Worldwide Interoperability for Microwave Access, or Wi-Fi, for example.

In an example embodiment, the wireless transceiver 406, while communicating with a mobile phone network, may require a subscriber identity module (SIM) 420, which may be an integrated circuit storing subscriber data, which is network-specific information used to authenticate and identify subscribers on the cellular network. The subscriber identity module may be embedded into a removable SIM card, on a mini-SIM card, for example. Furthermore, the portable test reader 100 may include a SIM card reader (not illustrated in FIG. 7), for example. Besides being implemented on a SIM card, the subscriber identity module 420 may be implemented with other techniques as well, such as a virtual/embedded SIM.

In an example embodiment, the portable test reader 100 includes a RFID reader 408 capable of reading RFID data 214, 218 programmed into the electronic tag 204, 208 of the test structure 102 or its container 210. The reader 408 reads 214, 218 the data from the tag 204, 208 with electromagnetic radiation of radio frequency. The tag 204, 208 may comprise at least two parts: an integrated circuit for storing and processing information, modulating and demodulating a RF signal, and other specialized functions, and an antenna for receiving and transmitting the signal. The tag 204, 208 may be passive (using no battery), active (with a battery and always broadcasting its signal) or battery assisted passive (with a battery and activated by the presence of the reader 408). In an example embodiment, near field communication (NFC) may be utilized. NFC is a set of standards for smartphones and similar devices to establish radio communication with each other by touching them together or bringing them into close proximity. NFC utilizes various short-range wireless technologies, typically requiring a distance of four centimetres or less. In NFC, the reader 408 is also known as an initiator generating a radio frequency field powering and reading 214, 218 the data from the external object 204, 208 also known as a passive target.

The portable test reader 100 comprises, as already earlier mentioned, one or more processors 410, and one or more memories 418 including computer program code 412.

In an example embodiment, the term 'processor' 410 refers to a physical device that is capable of processing data in a computer or other digital electronic device. Depending on the processing power needed, the portable test reader 100 may comprise several processors 410 such as parallel processors or one or more multicore processors. A non-exhaustive list of implementation techniques for the processor 410 includes, but is not limited to: logic components, standard integrated circuits, application-specific integrated circuits (ASIC), system-on-a-chip (SoC), application-specific standard products (ASSP), microprocessors, digital signal processors, special-purpose computer chips, and field-programmable gate arrays (FPGA).

In an example embodiment, the term 'memory' 418 refers to a physical device that is capable of storing the code 412 of the computer program and data on a temporary or permanent basis for use in a computer or other digital electronic device. In an example embodiment, the term 'memory' refers to working memory (also known as primary storage, main memory or internal storage) directly accessible to the processor. In an example embodiment, the working memory may be implemented as a random-access memory (RAM), such as a dynamic RAM, DRAM.

In an example embodiment, the computer program code 412 includes an operating system 414 and application software 416. The operating system may be Android, Microsoft Windows Phone, Apple iOS, Linux, or Symbian, for example. The application software 416 includes all the applications running in the portable test reader 100.

Naturally, the portable test reader 100 may include a number of other components but they will not be further described because the other components are not required to illustrate the present embodiments.

Figure 8:
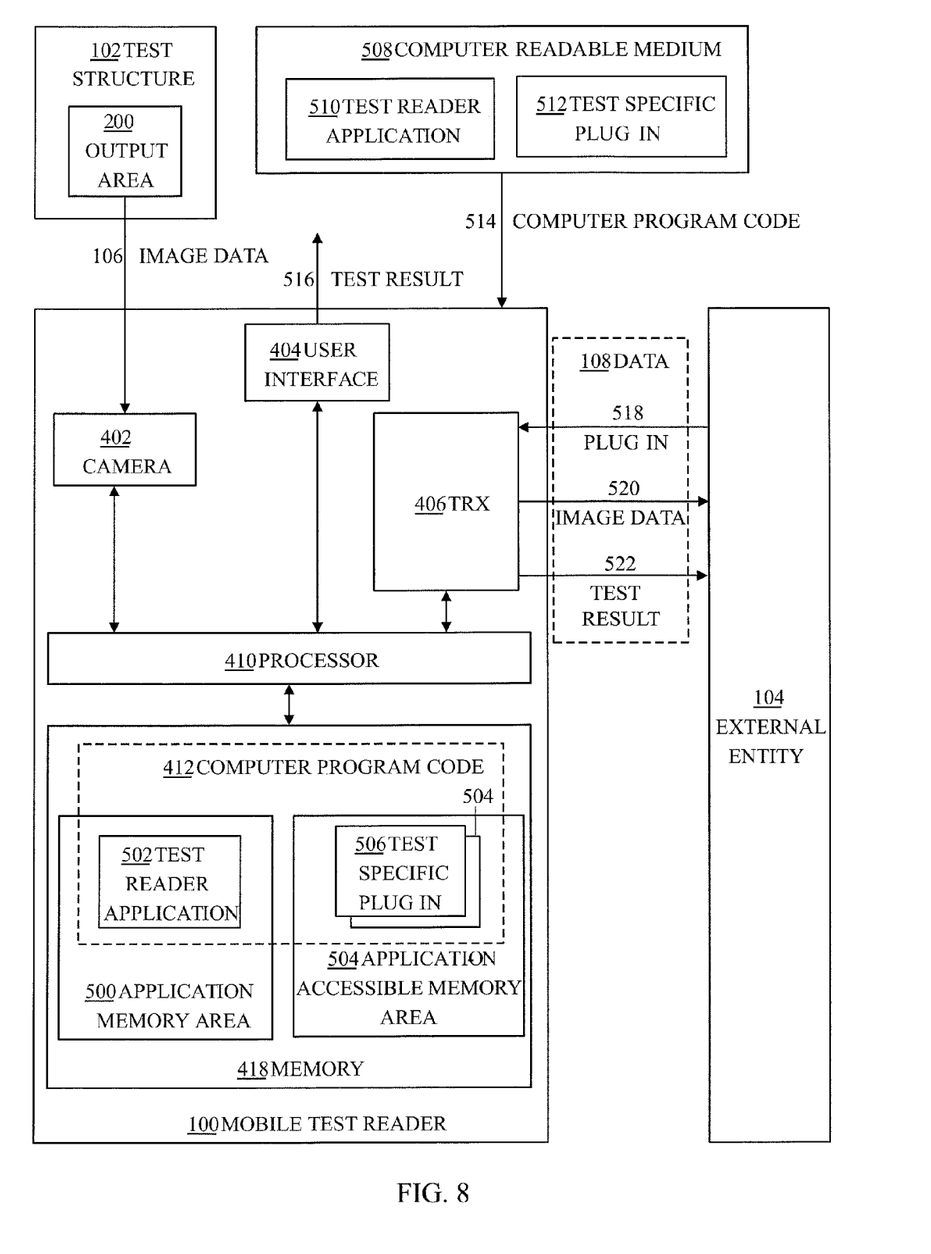

Let us next study FIG. 8, illustrating further example embodiments of the portable test reader 100, especially the way the portable test reader 100 interacts with the test structure 102 and the external entity 104.

The one or more memories 418 and the computer program code 412 may be configured to, with the one or more processors 410, cause the portable test reader 100 to receive, with the wireless transceiver 406, a test-specific plug-in 518 from the external entity 104, to configure a test reader application 502 with the received test-specific plug-in 506, and to take, with the digital camera 402 controlled by the test reader application 502 configured with the test-specific plug-in 506, image data 106 depicting the output area 200 of the test structure 102.

With this mechanism, the test reader application 502 may be configured with various test-specific plug-ins 506, 504, i.e. the memory 418 may contain different test-specific plug-ins, one for each different type of test structure 102.

In an example embodiment, the test-specific plug-in 506 comprises at least some of the following information:
- an image taking instruction for taking of the image data 106 with the digital camera 402, the image taking instruction comprising at least one of the following: manual/automatic mode, focus distance, location, focus, lighting, shooting angle;
- an analysis instruction for analysis of the image of the output 200, the analysis instruction comprising at least one of the following: optical readability, colour info, ratiometric numbers, a test limit parameter, a test criterion, a test reliability parameter, a test quality parameter, a test validity parameter;

general information on the test structure 102, the general information comprising at least one of the following: an identifier of a manufacturing batch of the test structure 102, a manufacturer identifier, a manufacturing date of the test structure 102, information on the quality of the production batch of the test structure 102, information on the use by date of the test structure 102, information on the dimensions or relative dimensions of the output area 200, information on the dimensions or relative dimensions of the test structure 102. The information may further be related to the size of the test window 10 in pixels when the distance between the camera 402 and the test structure 102 is correct for capturing at least one image, for example. When the at least one image has been captured, the size of the test window 10 in the at least one image may be computed. Then the computed size and the predetermined information about the size of the test window 10 may be compared and on the basis of the comparison it may be determined whether the distance between the camera 402 and the test structure 102 has been too short, correct or too long when the at least one image was captured. On the basis of the determination whether the distance between the camera 402 and the test structure 102 has been too short, correct or too long, the user is instructed to move the camera 402 closer, farther or to keep the camera still for further image captures. Alternatively or additionally, some other property of the test structure 102 may be used to guide the user for capturing proper images. In this manner, images may be focused well and the images may then be sharp. Additionally, the image of the test window 10 has the best resolution at the guided distance such that it has a maximum number of pixels. That improves the image processing.

Naturally, the above described information for the test-specific plug-in 506 is just a non-limiting example embodiment. Furthermore, the following information may or may not be present in the test-specific plug-in: a test structure 102 identifier, a name for the test structure 102, a name in the local language(s) for the test structure 102, an image analysis algorithm, a flashlight instruction (on/off/intensity), a bounding box (=an area within which the output 200 is searched for), size and location of an aim1ng crosshair (or box, or other aim1ng aid) for the output 200, size of the output 200 in pixels, a minimum and maximum aspect ratio between the breadth and height of the output 200, a minimum and maximum intensity of the stripe(s) in the output 200, location of the stripe(s) in the output 200, a reliability threshold for successive similar video frames, a maximum allowable deviation for the shooting angle in roll and pitch directions, an offset for said maximum allowable deviation, test interpretation rules, workflow rules for the test. The workflow rules for the test may include various information relating to the correct workflow of the testing procedure. The workflow rule may determine that the test result needs to be read after a predetermined time period (5 minutes, for example) from the insertion of the sample in the test structure 102. The workflow rule may determine when the test result may be shown to the user: immediately, or after a medical doctor or other authority has examined the test result.

Furthermore, the one or more memories 418 and the computer program code 412 may further be configured to, with the one or more processors 410, under the control of the test reader application 502 configured with the test-specific plug-in 506, cause the portable test reader 100 to perform at least one of the following: transmit, with the wireless transceiver 406, the image data 520 to the external entity 104; generate, with the test reader application 502 configured with the test-specific plug-in 506, a test result for the test on the basis of the image data 106; transmit, with the wireless transceiver 406, the test result 522 to the external entity 104; output, with the user interface 404, the test result 516. This means that the portable test reader 100 may just transmit the image data 520 to the external entity 104, whereupon the external entity 104 generates the test result. Or it may mean that the test result is generated in the portable test reader 100, and the test result is shown to the user and/or transmitted to the external entity 104. Even though the test result is generated in the portable test reader 100, the image data 520 may still be transmitted to the external entity 104 as well.

In an example embodiment, the one or more memories 418 may comprise an application memory area 500 and an application-accessible memory area 504. The computer program code of the test reader application 502 may be stored in the application memory area 500. The one or more memories 418 and the computer program code 412 may further be configured to, with the one or more processors 410, cause the portable test reader 100 to store the received test-specific plug-in 506 in the application-accessible memory area 504.

In an example embodiment, the one or more memories 418 and the computer program code 412 may further be configured to, with the one or more processors 410, cause the portable test reader 100 to store the received test-specific plug-in 506 in the application-accessible memory area 504 without having to exercise any control by an authority other than the user of the portable test reader 100.

In an example embodiment, the one or more memories 418 and the computer program code 412 may further be configured to, with the one or more processors 410, cause the portable test reader 100 to configure the test reader application 502 with the test-specific plug-in 506 without having to restart the portable test reader 100 and/or the test reader application 502.

In an example embodiment, the one or more memories 418 and the computer program code 412 may further be configured to, with the one or more processors 410, cause the portable test reader 100 to configure the test reader application 502 with the test-specific plug-in 506 automatically, i.e. without any user interaction, or with the user confirming the operation. Optionally, the user may be informed that the update of the test-specific plug-in 506 has been made.

Figure 9:
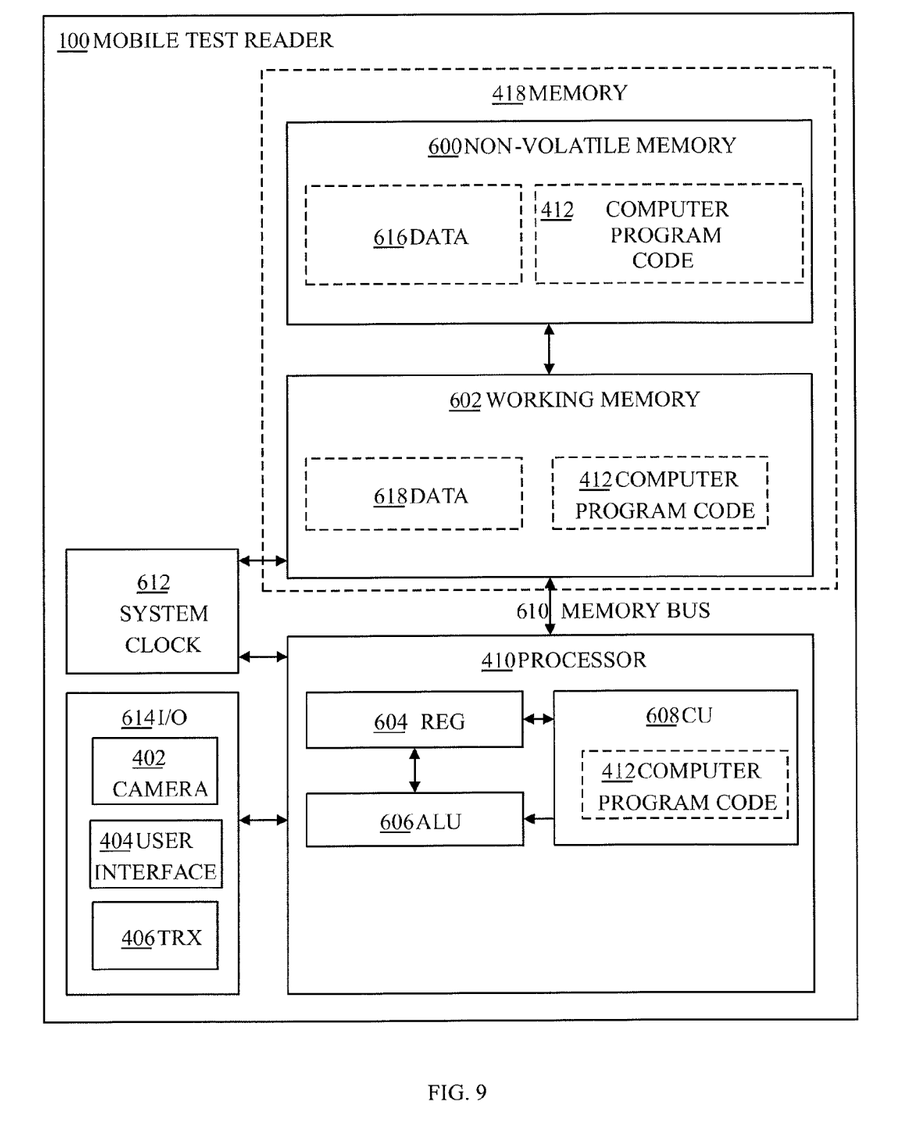

In an example embodiment illustrated in FIG. 9, the portable test reader 100 may comprise an electronic digital computer, which may include a non-volatile memory 600 and a working memory 602 as the memory 418, the processor 410, a system clock 612 and an input/output 614 including the digital camera 402, the user interface 404, and the wireless transceiver 406. Naturally, the computer may comprise a number of other peripheral devices, not illustrated here for the sake of clarity. Also, the architecture of FIG. 9 is just one example embodiment as other feasible computing architectures may be utilized as well to implement the hardware and software of the portable test reader 100.

In an example embodiment, the system clock 612 constantly generates a stream of electrical pulses, which cause the various transferring operations within the computer to take place in an orderly manner and with specific timing.

In an example embodiment, the processor 410 may be implemented as a microprocessor implementing functions of a central processing unit (CPU) on an integrated circuit. The CPU 410 is a logic machine executing the computer program code 412. The computer program code 412 may be coded as a computer program using a programming language, which may be a high-level programming language, such as C, C++, or Java, or a low-level programming language, such as a machine language, or an assembler. There are many ways to construct the computer program code 412 In an example embodiment, the operations of the computer program code 412 may be divided into functional modules, sub-routines, methods, classes, objects, applets, macros, etc., depending on the software design methodology and the programming language used. In modern programming environments, there are software libraries, i.e. compilations of ready-made functions, which may be utilized by the computer program code 412 for performing a wide variety of standard operations.

The CPU 410 may comprise a set of registers 604, an arithmetic logic unit (ALU) 606, and a control unit (CU) 608. The control unit 608 is controlled by the computer program code 412 transferred to the CPU 410 from the working memory 602. The working memory 602 is directly or indirectly connected to the CPU 410 via a memory bus 610 including two buses: an address bus and a data bus. The CPU 410 sends a memory address indicating the desired location of data 618 (such as the image data 106, or data 108) or computer program code 412 through the address bus, whereupon the CPU 410 reads or writes the data itself from/to the working memory 602 using the data bus.

The control unit 608 may contain a number of microinstructions for basic operations. The implementation of the microinstructions may vary, depending on the CPU design. The microprocessor 410 may also have an operating system (such as a general-purpose operating system), which may provide the computer program code 412 with system services. During running of the computer program code 412, the computer program code 412 or a part of it are transferred via the memory bus 610 from the working memory 602 into the control unit 608, wherein usually a portion of the computer program code 412 resides and controls the operation.

In an example embodiment, the non-volatile memory 600 retains the stored information even when not powered. Examples of non-volatile memory include read-only memory (ROM), flash memory, magnetic computer storage devices such as hard disk drives, and optical discs. As is shown in FIG. 9, the non-volatile memory 600 may store both data 616 and the code 412 of the computer program.

An example embodiment, illustrated in FIG. 8, provides a computer readable medium 508 comprising the computer program code 412 of the test reader application 510 and the test-specific plug-in 512. Said computer program code 412, when executed on the portable test reader 100, causes the portable test reader 100 to perform the operations required to implement the described example embodiments. In an example embodiment, the computer program code 412 may be in source code form, object code form, or in some intermediate form. The computer-readable medium 508 may comprise at least the following: any entity or device capable of carrying 514 computer program code 412 to the portable test reader 100, a record medium, a computer memory, a read-only memory, an electrical carrier signal, and a software distribution medium. In some jurisdictions, depending on the legislation and the patent practice, the computer-readable medium 508 may also be a telecommunications signal. In an example embodiment, the computer-readable medium 508 may be a non-transitory computer readable storage medium.

Figure 10:
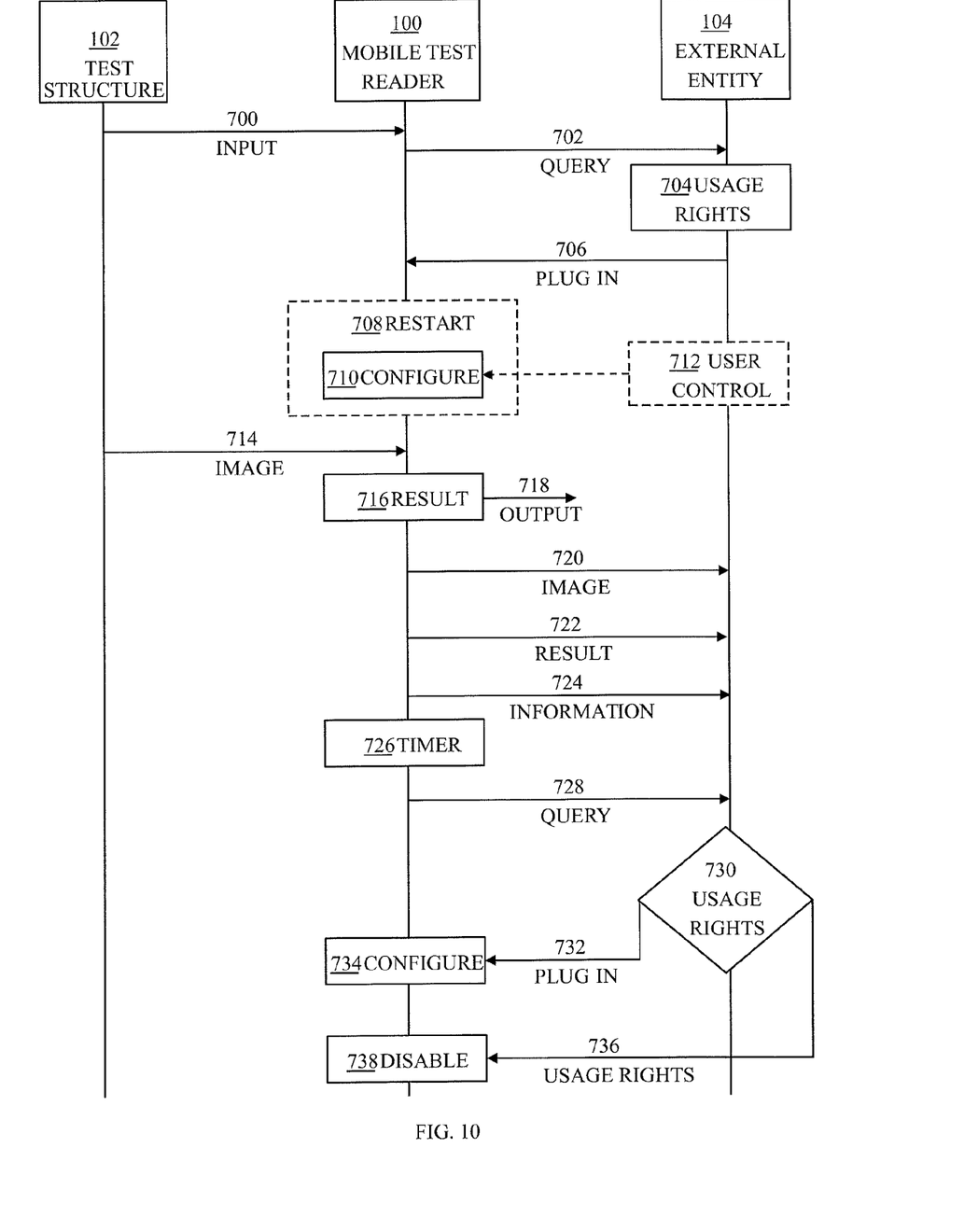

Finally, with reference to FIG. 10, examine the communication of the portable test reader 100 and some further example embodiments in the form of a signal sequence chart. Other functions, not described in this application, may also be executed between the operations or within the operations.

Some of the operations or parts of the operations may also be left out or replaced by a corresponding operation or part of the operation.

In an example embodiment, the portable test reader 100 may input 700, with the digital camera 402 or with the user interface 404, or with a wireless reading (with the RFID reader 408), an identifier of the test structure 102 and/or type of the test structure 102 to the test reader application 502.

In an example embodiment, the portable test reader 100 may, prior to receiving the test-specific plug-in 506 from the external entity 104, transmit 702, with the wireless transceiver 406, a query to the external entity 104 regarding the test-specific plug-in 506, the query including the present status of the test-specific plug-in 506, the present status indicating the presence of the test-specific plug-in 506, and/or or the version number of the test-specific plug-in 506. If the test-specific plug-in 506 is present, the version number may be transmitted, but if the test-specific plug-in is missing, only the presence information may be transmitted.

In an example embodiment, the portable test reader 100 may transmit, with the wireless transceiver 406, information relating to the portable test reader 100 to the external entity 104, the information relating to the portable test reader 100 including at least one of the following: type of the portable test reader 100, location of the portable test reader 100, local time of the portable test reader 100, information on the climatic conditions surrounding the portable test reader 100.

As illustrated in FIG. 7, in order to determine a location of the test reader 100, the portable test reader 100 may comprise a positioning receiver 424 receiving external location information, which may be utilized to generate location of the portable test reader 100. The positioning receiver 424 may be a receiver of a global navigation satellite system (GNSS). Such a system may be the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. The positioning receiver 424 determines its location (longitude, latitude, and/or altitude) using signals transmitted from satellites orbiting the earth. Besides global navigation satellites, the positioning receiver 424 may also determine its location by utilizing other known positioning techniques. It is well known that by receiving radio signals from several different base stations, a mobile phone may determine its location, for example.

FIG. 10 also illustrates the earlier described basic sequence: the portable test reader 100 may receive 706, with the wireless transceiver 406, the test-specific plug-in 518 from the external entity 104, configures 710 the test reader application 502 with the received test-specific plug-in 506, and takes 714, with the digital camera 402 controlled by the test reader application 502 configured with the test-specific plug-in 506, image data 106 depicting the output area 200 of the test structure 102.

Note, as was explained earlier, that in an example embodiment the portable test reader 100 stores the received test-specific plug-in 506 in the application-accessible memory area 504 without having to exercise any control 712 by an authority other than the user of the portable test reader 100. The portable test reader 100 also configures in an example embodiment the test reader application 502 with the test-specific plug-in 506 without having to restart 708 the portable test reader 100 and/or the test reader application 502. Accordingly, reference numerals 708 and 712 refer to such operations that are not required at all in certain example embodiments.

The earlier described basic sequence continues in FIG. 10 as follows: the portable test reader 100, under the control of the test reader application 502 configured with the test-specific plug-in 506, may perform at least one of the following: transmits 720, with the wireless transceiver 406, the image data 520 to the external entity 104; generates 716, with the test reader application 502 configured with the test-specific plug-in 506, a test result for the test structure 102 on the basis of the image data 106; transmits 722, with the wireless transceiver 406, the test result 522 to the external entity 104; outputs 718, with the user interface 404, the test result 516. As explained earlier, also other information 724 may be transmitted from the portable test reader 100 to the external entity 104.

In an example embodiment, the portable test reader 100 may receive 706, with the wireless transceiver 406, the newest version of the test-specific plug-in 506, and configures 710 the test reader application 502 with the newest version of the test-specific plug-in 506.

The configuring of the test reader application 502 with the test-specific plug-in 506 may be performed as required. When the portable test reader 100 prepares for reading the test structure 102, it may query 702 the external entity for the test-specific plug-in 506, either for the first time, or for the latest version. FIG. 10 also illustrates another example embodiment, the portable test reader 100 may include a timer mechanism 726, with which the portable test reader 100 is able to query for the newest version of the test-specific plug-in at predetermined intervals (every five minutes, for example) or at predetermined times (once a day or week at noon, for example). The external entity 104 may also transmit the test-specific plug-in 506 to the portable test reader 100 without any stimulus received from the portable test reader 100, with a push mechanism, for example.

In an example embodiment, the portable test reader 100 may manage, with the test reader application 502 the usage rights 704, 730 of the test structure 102 such that the test-specific plug-in 506 is removed if no usage rights exist for the test structure 102 on the basis of information received from the external entity 104 with the wireless transceiver 406.

In an example embodiment, the portable test reader 100 may transmit 728, with the wireless transceiver 406, hardware identifier of the portable test reader 100 and/or user account information of the user of the portable test reader 100 to the external entity 104, and receives 732/736, with the wireless transceiver 406, usage rights of the test-specific plug-ins 506, 504.

In an example embodiment, the external entity 104 may keep 730 track of the usage rights of the test structure 102, whereby, if the usage rights exists, the external entity 104 transmits 732 the test-specific plug-in to the portable test reader 100, whereupon the portable test reader 100 configures 734 the test reader application 502 with the test-specific plug-in 506, or, if the usage rights do not exist, the external entity 104 only transmits 738 usage rights information to the portable test reader 100, whereupon the portable test reader 100 disables 738 the test-specific plug-in 506, if such is present in the portable test reader 100. The disable-function 738 may just make the test-specific plug-in 506 inoperable, or it may remove the test-specific plug-in 506 altogether.

In an example embodiment, the portable test reader 100 may calculate a check-sum for the present test-specific plug-ins 506, 504, and the check-sum is transmitted to the external entity 104. The external entity 104 may maintain an account for each portable test reader 100, i.e. usage rights of each portable test reader 100 for the test-specific plug-ins 506, 504. If the check-sum that is in the account matches with the check-sum that is received from the portable test reader 100, the external entity 104 may determine that no update is required. However, if the check-sums do not match, the external entity 104 may initiate the required operations as regards to the usage rights: either a new plug-in is transmitted to the portable test reader 100, some or all plug-ins are updated, or one or more plug-ins are made inoperable or even removed from the portable test reader 100, for example.

Figure 11:
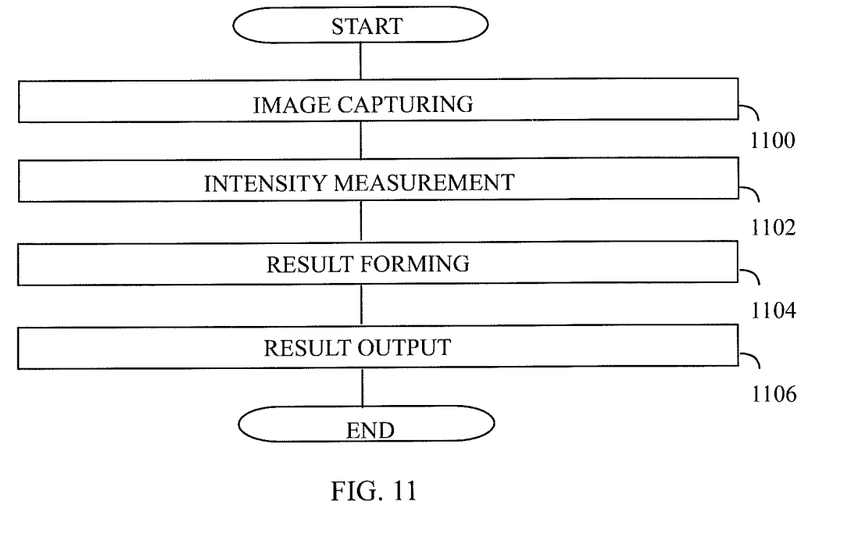
FIG. 11 illustrates a flow chart of the method.

FIG. 11 illustrates a flow chart of the method. In step 1100, at least one image of locations of at least one test line, at least one control line and at least one reference of a test structure is captured by a digital camera. In step 1102, an intensity associated with the at least one test line, an intensity associated with the at least control line and an intensity of the at least one reference in the at least one image are measured by a processing arrangement. In step 1104, a test result as a function of measured intensities associated with the at least on test line, the at least control line and the at least one reference is formed by the processing arrangement. In step 1106, the test result is output by the user interface.

It will be obvious to a person skilled in the art that, as technology advances, the inventive concept can be implemented in various ways. The invention and its embodiments are not limited to the example embodiments described above but may vary within the scope of the claims.

The invention claimed is:

1. The portable lateral test reader apparatus, wherein the portable lateral test reader apparatus comprises a processing arrangement, a digital camera and a user interface; and the processing unit comprises: one or more processors; and one or more memories including computer program code; the one or more memories and the computer program code configured to, with the one or more processors, cause the portable test reader apparatus at least to:
  capture at least one image of locations of at least one line and at least one reference of a test structure with the digital camera;
  measure an intensity associated with the at least one line and an intensity of the at least one reference in the at least one image;
  form a test result as a function of measured intensities associated with the at least one line and the at least one reference by forming at least one test reference ratio, each test reference ratio being formed on the basis of an intensity of a test line and an intensity of a reference; forming at least one control reference ratio, each control reference ratio being formed on the basis of an intensity of a control line and an intensity of a reference; and forming the test result on the basis of at least one result ratio, each result ratio being formed on the basis of a test reference ratio and a control reference ratio; and
  output, with the user interface, the test result.

2. The portable lateral test reader apparatus of claim 1, wherein the one or more memories and the computer program code configured to, with the one or more processors, cause the portable test reader apparatus at least to:
  form each test reference ratio on the basis of an intensity of a test line and an intensity of a corresponding reference; and
  form each control reference ratio on the basis of an intensity of a control line and an intensity of a corresponding reference, a reference being adjacent to a test line and a reference being adjacent to a control line.

3. The portable lateral test reader apparatus of claim 1, wherein the one or more memories and the computer program code configured to, with the one or more processors, cause the portable test reader apparatus at least to:
  reject a test reference ratio if the intensity of the test line is outside a predetermined range; and
  reject a control reference ratio if the intensity of the control line is outside a predetermined range.

4. The portable lateral test reader apparatus of claim 1, wherein the one or more memories and the computer program code configured to, with the one or more processors, cause the portable test reader apparatus at least to:
  form each of the result ratios on the basis of one image of a plurality of images.

5. The portable lateral test reader apparatus of claim 4, wherein the one or more memories and the computer program code configured to, with the one or more processors, cause the portable test reader apparatus at least to:
  determine a quality of the result ratios on the basis of variation in the result ratios associated with more than one image.

6. The portable lateral test reader apparatus of claim 5, wherein the one or more memories and the computer program code configured to, with the one or more processors, cause the portable test reader apparatus at least to:
  accept the result ratios associated with an image for the measurement if the quality is higher than a predetermined threshold; and
  output the test result if the number of acceptable images is higher than a predetermined threshold.

7. The portable lateral test reader apparatus of claim 4, wherein the one or more memories and the computer program code configured to, with the one or more processors, cause the portable test reader apparatus at least to:
  filter the result ratios in a statistical manner for improving the test result.

8. The portable lateral test reader apparatus of claim 7, wherein the one or more memories and the computer program code configured to, with the one or more processors, cause the portable test reader apparatus at least to:
  perform filtering by at least one of the following: averaging, median filtering, rejecting a result ratio deviating from an average more than a predetermined threshold variation.

9. The portable lateral test reader apparatus of claim 1, wherein the one or more memories and the computer program code configured to, with the one or more processors, cause the portable test reader apparatus at least to:
  detect a test window and the at least one reference of a test structure for image capturing, the test window including the at least one test line and the at least one control line, the at least one reference being physically inside or beside the test window.

10. The portable lateral test reader apparatus of claim 9, wherein the one or more memories and the computer program code configured to, with the one or more processors, cause the portable test reader apparatus at least to:
  determine a quality for each image of the test window in N images;
  accepting an image for the measurement if the quality of the test window is better than a predetermined threshold quality, otherwise rejecting the image;
  perform the measurement if M images of the N images have an accepted quality where M and N are integers, N being equal to or larger than M.

11. The portable lateral test reader apparatus of claim 10, wherein the one or more memories and the computer program code configured to, with the one or more processors, cause the portable test reader apparatus at least to: continue capturing images until M images of the N images have an accepted quality.

12. A method for a portable lateral test reader apparatus, the method comprising
- capturing, by a digital camera, at least one image of locations of at least one test line, at least one control line and at least one reference of a test structure;
- measuring, by a processing arrangement, an intensity of the at least one reference, an intensity associated with the at least one test line and an intensity associated with the at least one control line in the at least one image;
- forming, by the processing arrangement, a test result as a function of measured intensities associated with the at least one reference, the at least one test line and the at least one control line by forming at least one test reference ratio, each test reference ratio being formed on the basis of an intensity of a test line and an intensity of a reference; forming at least one control reference ratio, each control reference ratio being formed on the basis of an intensity of a control line and an intensity of a reference; and forming the test result on the basis of at least one result ratio, each result ratio being formed on the basis of a test reference ratio and a control reference ratio; and
- outputting, through the user interface, the test result.

13. A computer program product embodied on a distribution non-transitory medium readable by a computer and comprising program instructions which, when loaded into the portable test reader apparatus, causing a computer process perform the method steps of claim 12.

* * * * *